June 1, 1926.
P. J. LUCEY
1,586,562
MEAT SLICING MACHINE
Filed Jan. 24, 1925
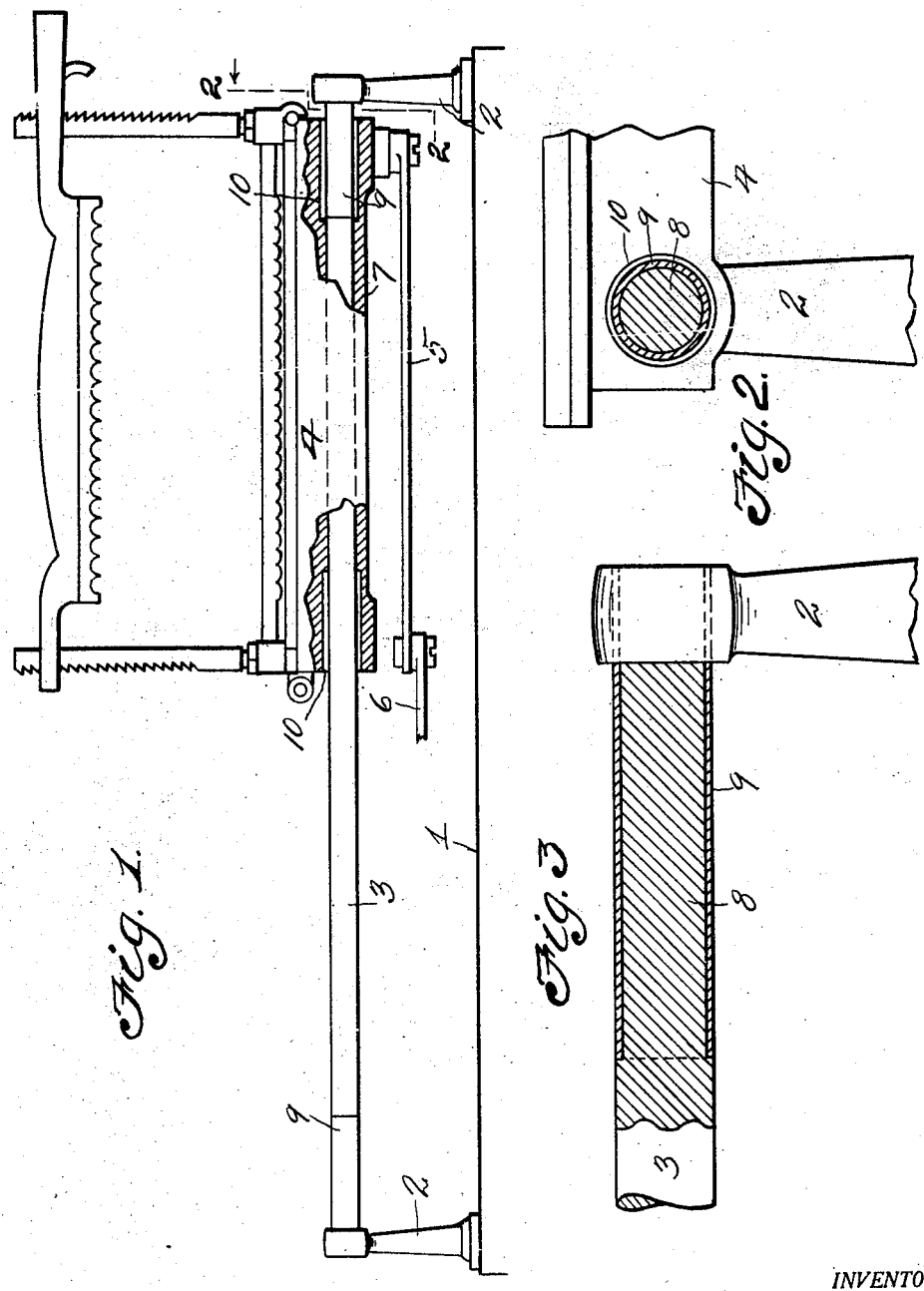
INVENTOR.
Patrick J. Lucey
BY
ATTORNEY.

Patented June 1, 1926.

1,586,562

UNITED STATES PATENT OFFICE.

PATRICK J. LUCEY, OF SOUTH BEND, INDIANA, ASSIGNOR TO LUCEY SLICING MACHINE CO., OF SOUTH BEND, INDIANA.

MEAT-SLICING MACHINE.

Application filed January 24, 1925. Serial No. 4,519.

The invention relates to meat slicing machines, and has for its object to provide means whereby the ends of the table guide rods as well as the guide rods may be maintained clean at all times, and free from rust and accumulation of offal or scraps from the meat, which is a common difficulty now experienced with meat slicing machines where the table reciprocates on guide rods, and which accumulation of rust or scraps on the guide rods detracts from the appearance of the machine, creates the impression the entire machine is dirty and at the same time is unsanitary.

A further object is to provide the ends of the guide rods with sleeves formed from an easily cleaned material, for instance nickel plated and which sleeves may be easily wiped off from time to time, and at the same time will not rust. The sleeves extend substantially to the ends of the strokes of the table and into enlarged apertures in the ends of the table, the walls of which apertures are spaced from the peripheries of the sleeves, therefore the sleeves will not be marred by the engagement therewith of the table, during its reciprocation, consequently the nickel plating may be easily maintained bright by simply wiping the accumulation of meat scraps therefrom. The main body of the guide rods is maintained polished by the bearing of the table.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 1 is a side elevation of a portion of a meat slicing machine, showing the guide rod and table mounted thereon.

Figure 2 is a detail sectional view taken on line 2—2 of Figure 1.

Figure 3 is a vertical longitudinal sectional view through one end of the guide rod and sleeve.

Referring to the drawings, the numeral 1 designates the base of a meat slicing machine, 2 vertically disposed posts carried thereby and 3 a horizontally disposed guide rod. Slidably mounted on the guide rod 3 is a meat receiving table 4, on which meat is placed and held in the usual manner for movement against a rotatable knife during the reciprocation of the table 4. Table 4 is reciprocated in the usual manner through the connecting rod 5, and rod 6 which may be operated in any suitable manner.

In machines of this character the table 4, during its reciprocation, does not at the ends of its stroke move the full length of the guide rod as clearly shown in Figure 1, and it has been found that offal or scraps from the meat accumulate on the ends of the rod and materially detract from the appearance of the machine as well as render the same unsanitary, and it has also been found that the ends of the guide rod rust, while the main body of the rod, which passes through the bearing sleeve 7 of the table, is maintained polished by the bearing sleeve. To overcome the above difficulty the ends of the rod 3 are provided with reduced portions 8, on which are disposed sleeves 9, formed from a material, which may be easily and quickly cleaned by simply rubbing a rag over the same, and on which rust will not form, for instance the sleeve 9 may be formed from a non-corrosive metal, however they are preferably nickel plated, which will materially add to the appearance of the machine, and at the same time will not rust, and any collection of meat scraps thereon may be easily wiped off from time to time. During the reciprocation of the table 4, the sleeves 9 are received at the ends of the strokes of the table in apertures 10 in the ends of the table sleeve 7, at the same time the sleeve will polish the main body of the rod 3 for substantially its full length. Apertures 10 are of greater diameter than the diameter of the sleeves 9, consequently when the sleeves 9 are received in the apertures 10 the inner periphery of the apertures will not engage the outer surfaces of the sleeve 9, consequently will not mar the finish thereof or wear the nickel plating off the sleeves 9. From time to time during the operation of the device the operator may wipe off the sleeves 9, consequently the sleeves will be maintained bright and clean as well as santiary, and the general clean sanitary appearance of the machine maintained, which is a material point in vending meats, a customer who sees the accumulation of rust or scraps on the ends of the guide rods forms the opinion the concealed portions of the machine are equally dirty and unsanitary.

From the above it will be seen that means is provided for the ends of the guide rods of a meat slicing machine whereby said ends may be maintained clean and sanitary at all times, and said means also materially adds to the ornmental appearance of the machine, and the rods may be cheaply manufactured without materially varying the construction thereof, or the operating parts of the machine.

The invention having been set forth what is claimed as new and useful is:—

The combination with a reciprocating table of a meat slicing machine, a guide rod on which said table is slidably mounted, a bearing member carried by the table and through which the guide rod extends, the ends of said guide rods being provided with reduced portions extending from the ends of the strokes of the table bearing portion, of sleeves of non-corroding material disposed on said reduced portions, the ends of said bearing member being provided with apertures of greater outside diameter than the diameter of the sleeve and in which the sleeves are received during the reciprocation of the table.

In testimony whereof I affix my signature.

PATRICK J. LUCEY.